United States Patent
Park et al.

(10) Patent No.: US 7,703,012 B2
(45) Date of Patent: Apr. 20, 2010

(54) ADAPTABLE TRANSFER AND PUBLICATION OF DIGITAL MEDIA

(75) Inventors: James Park, San Francisco, CA (US); Eric Nathan Friedman, San Francisco, CA (US); Gokhan Kutlu, San Francisco, CA (US)

(73) Assignee: CBS Interactive, Inc., County of New Castle, DE (US)

( * ) Notice: Subject to any disclaimer, the term of this patent is extended or adjusted under 35 U.S.C. 154(b) by 1101 days.

(21) Appl. No.: 11/302,684

(22) Filed: Dec. 13, 2005

(65) Prior Publication Data

US 2007/0136661 A1   Jun. 14, 2007

(51) Int. Cl.
  *G06F 15/00* (2006.01)
(52) U.S. Cl. ..................................... 715/249
(58) Field of Classification Search ................. 375/204; 715/249
  See application file for complete search history.

(56) References Cited

U.S. PATENT DOCUMENTS

| | | | |
|---|---|---|---|
| 5,463,698 A | | 10/1995 | Meyer |
| 5,761,655 A | * | 6/1998 | Hoffman .......................... 707/4 |
| 6,035,323 A | * | 3/2000 | Narayen et al. .............. 709/201 |
| 6,222,924 B1 | | 4/2001 | Salomaki ..................... 380/200 |
| 6,321,231 B1 | * | 11/2001 | Jebens et al. ............. 707/104.1 |
| 6,332,146 B1 | * | 12/2001 | Jebens et al. ............. 707/104.1 |
| 6,453,355 B1 | * | 9/2002 | Jones et al. .................. 709/230 |
| 6,578,072 B2 | * | 6/2003 | Watanabe et al. ........... 709/217 |
| 6,693,652 B1 | * | 2/2004 | Barrus et al. ................. 715/838 |
| 6,757,684 B2 | * | 6/2004 | Svendsen et al. .............. 707/10 |
| 6,833,848 B1 | | 12/2004 | Wolff et al. |
| 6,910,049 B2 | * | 6/2005 | Fenton et al. ............. 707/104.1 |
| 7,073,193 B2 | * | 7/2006 | Marsh ......................... 725/114 |
| 7,366,788 B2 | * | 4/2008 | Jones et al. .................. 709/230 |
| 7,487,155 B2 | * | 2/2009 | Jebens et al. ................... 707/10 |
| 2001/0002204 A1 | * | 5/2001 | Jebens et al. ........... 375/240.01 |
| 2002/0002586 A1 | | 1/2002 | Rafal et al. |
| 2002/0067923 A1 | * | 6/2002 | Fujimura ..................... 396/429 |

(Continued)

OTHER PUBLICATIONS

Sarvas, et al., "MobShare: controlled and immediate sharing of mobile images". In Proceedings of the 12th Annual ACM international Conference on Multimedia (New York, NY, USA, Oct. 10-16, 2004), p. 724-731.*

(Continued)

*Primary Examiner*—Amelia Rutledge
(74) *Attorney, Agent, or Firm*—Marc S. Kaufman; Nixon Peabody, LLP

(57) ABSTRACT

An adaptable method for facilitating user interaction with digital media objects. Representations of substantially-reduced data size of each of the digital media objects are transferred before the transfer of copies of the original data size of each of the digital media objects so as to enable earlier user interaction. The user interaction includes, for example, requesting modifications to the object. The method provides feedback of any requested action from the user interaction with the substantially-reduced data size representations and in response thereto, determines as a function of the requested action whether to reprioritize transfer of untransferred original data size copies of the corresponding digital media object. The method provides for modification of copies that are to be transferred according to modifications requested by the user with respect to the transferred substantially-reduced data size representations. The method can be used for audio, video, image, and other digital media objects.

28 Claims, 5 Drawing Sheets

U.S. PATENT DOCUMENTS

| | | |
|---|---|---|
| 2002/0087546 A1* | 7/2002 | Slater et al. .................... 707/10 |
| 2002/0135794 A1* | 9/2002 | Rodriguez et al. ......... 358/1.15 |
| 2003/0058457 A1 | 3/2003 | Fredlund et al. |
| 2003/0182210 A1 | 9/2003 | Weitzman et al. |
| 2003/0229900 A1 | 12/2003 | Reisman |
| 2004/0109063 A1* | 6/2004 | Kusaka et al. ............ 348/207.1 |
| 2004/0201735 A1 | 10/2004 | Baron |
| 2004/0201752 A1 | 10/2004 | Parulski et al. |
| 2004/0250205 A1* | 12/2004 | Conning ..................... 715/517 |
| 2005/0015710 A1 | 1/2005 | Williams |
| 2005/0038919 A1* | 2/2005 | Matsubara et al. ............. 710/1 |
| 2005/0055636 A1 | 3/2005 | Graves |
| 2005/0081237 A1 | 4/2005 | Chen et al. |
| 2005/0225799 A1 | 10/2005 | Berarducci et al. |

OTHER PUBLICATIONS

Finkelstein, et al., "Multiresolution video". In Proceedings of the 23rd Annual Conference on Computer Graphics and interactive Techniques SIGGRAPH '96. ACM, New York, NY, p. 281-290.*

* cited by examiner

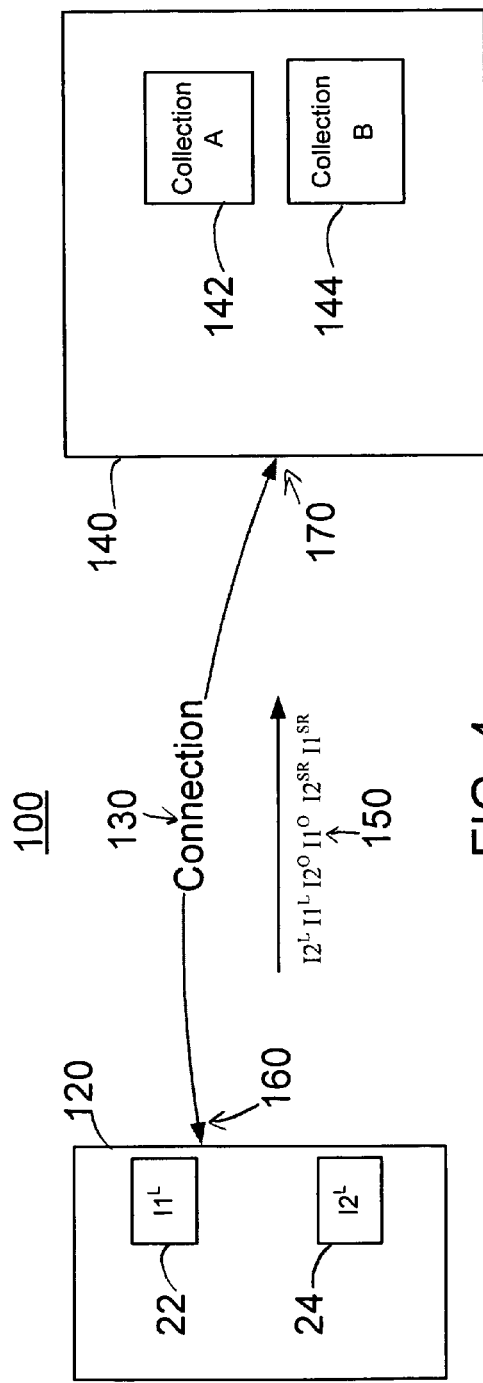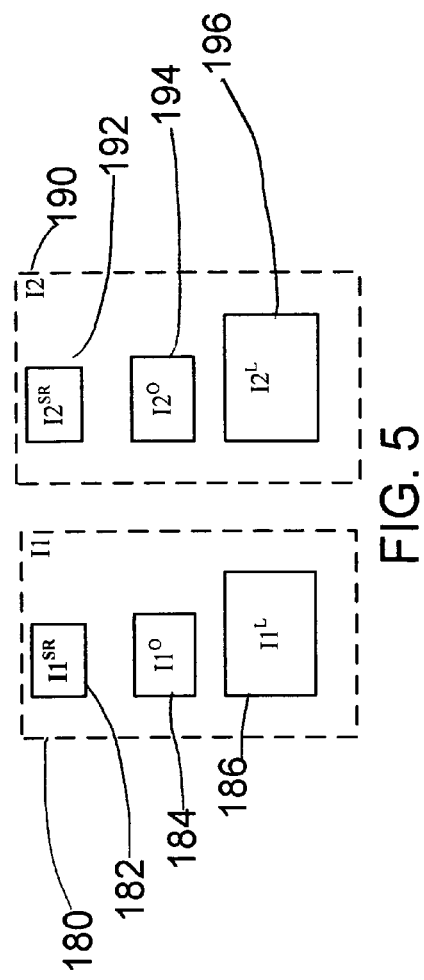

ADAPTABLE TRANSFER AND PUBLICATION OF DIGITAL MEDIA

FIELD OF THE INVENTION

This invention relates to methods for facilitating user interaction with digital media objects that are transferred from one device to another.

BACKGROUND OF THE INVENTION

Online publishing generally refers to putting digital content online, typically at a website. The digital content can include digital visual and aural media objects including, but not limited to, video, audio, and still image content. The online publisher typically enables a user who requested transfer of the digital media objects for publication and other authorized users to interact with published digital media objects via a user interface. For example, an authorized user may modify a digital media object, e.g., deletion. The quality of the user experience is lessened considerably if there are unreasonably delays between the request for transfer and the time that the user is allowed to interact with transferred digital media objects.

The online publishing of digital media objects is increasing rapidly. The largest photo sharing service, for example, has over two hundred million digital photo images accessible online. The largest online music service has over two million digital audio objects accessible online. Video content is increasingly being published on websites to enable online access.

Digital media objects are growing larger and larger as higher resolution digital devices and storage media become available to the average consumer. The size of a digital photo or digital video objects varies depending on the camera's megapixel resolution and the compression format used to generate the digital object. For example, digital photo cameras rated at 8 megapixel resolution capability or above are commonly available for consumers. An 8 megapixel digital photo camera typically enables selection of several different resolutions, e.g., 640×480 up to 3264×2448 (3264×2448=7,990,272 pixels). The size of a digital video file depends on various factors including the time duration, number of frames per second, resolution and amount of compression. High resolution digital video cameras are available to consumers, thus enabling creation of even larger digital media files.

For images and video, resolution directly affects quality in that the higher the resolution, the more picture detail is captured in each image or frame and the closer the result can resemble the original source. The size of a digital audio object is a function of the length of the audio segment and the digital encoding format. Lossy or lossless compression are typically used for encoding audio objects to reduce storage requirements and transfer time.

Conventional online publishing services typically enable a user to transfer, i.e., upload, digital media objects and make them a part of collections that can be shared with the public or designated individuals. The known services also offer the options to do some editing as part of the interaction with the uploaded content, e.g., adding captions to further identify the object or rotating a photo.

The conventional uploading of digital media objects to a website, for example, is time consuming especially for uploading a large number of large digital media objects. Upload time can vary from a few seconds up to several minutes or hours, depending on the speed of the connection and the size and number of the objects. Many users have slow dial-up connections which cause uploads to take considerable time using conventional methods. Many users are migrating from slower dial-up connections to faster broadband connections. Although broadband connections provide faster download times of several megabits per second, the upload speed for broadband connections is typically limited to a much slower speed, e.g., about 125 Kilobytes per second for a cable modem. A typical online digital photo album has approximately fifty pictures. Assuming eight megapixels per image with a compressed file size in JPG format of just over 2 MB and the upload transfer rate of 125 KBytes/second, the transfer of the fifty digital photos could take more than fifteen minutes. The transfer time may be even longer when a wireless protocol, such as BLUETOOTH, cellular, etc., is used to transfer the digital media object.

FIG. 1 shows an exemplary block diagram of a system 10 illustrating digital media object transfer and publishing aspects according to a conventional method. The system 10 includes a client device 20 connecting via a connection 30 to a device 40. The client device 20 is a computing device, e.g., a personal computer, handheld device having network capability, or the like. The connection 30 is typically via the Internet, although other suitable connections for connecting computing devices, e.g., BLUETOOTH, cellular, etc. are used. The device 40 is typically any computing device capable of publishing content for distribution over a network, such as a server, as shown.

In the exemplary scenario for the system illustrated in FIG. 1, a request is made to transfer two digital media objects $I1^L$, identified as 22, and $I2^L$, identified as 24, from client device 20 to the server 40. The objects 22 and 24 have an original file size which is also referred to as the large size and noted by the superscript "L". The digital media objects may be images, video, or audio objects. The digital media objects 22 and 24 are typically published at the server 40 such that a user can access them via the connection 30 from either the client device 20 or another similar device (not shown). A typical server 40, such as at a photo sharing site, for example, enables a user to access the original size image and one or more smaller sized copies, including a display size (also referred to as medium) and thumbnail size (also referred to herein as small) copies. Multiple sizes are typically published to enhance the user's experience by enabling the user to, for example, view thumbnail photos to see more of the contents of photos collected into an album, view larger display size photos to see more details of the image, etc.

FIG. 2 illustrates sets 60 and 70 of exemplary reduced file sized copies and the original file size copies of the two digital media objects 22 and 24. Set 60 includes for image I1 a small size copy 62, shown also $I1^S$, a medium sized copy, shown also $I1^M$, and a large size copy, shown as $I1^L$. Similarly, set 70 includes for image I2 a small size copy 72, shown also $I2^S$, a medium sized copy, shown also $I2^M$, and a large size copy, shown also as $I2^L$. It should be appreciated that original size is referred to in FIG. 2 as the large size in comparison to the other reduced sizes shown. In the example in FIG. 2, the three sizes are generated typically using software on the local client device 20, and then transferred to the server 40.

FIG. 1 shows the order 50 in which the different sized copies in sets 60 and 70 are sent to the server 40 from the client device 20 via the connection 30, according to a conventional method. The conventional method, shown in the example in FIG. 1, transfers the small size $I1^S$, followed by the medium size $I1^M$, followed by the large size, $I1^L$ copy of the first object I1. The small size copy of object I2, $I2^S$, is only transferred using the conventional method after the largest copy of the previous object, $I1^L$, has been transferred. As shown at 50, the order of the transfer for the copies of object 12 is the small size $12^S$, followed by the medium size $12^M$, and followed by the large size, $12^L$. The prior art system 10 makes the transfer in a non-adaptable way such that the transfer always follows the order shown at 50 independently of any actions requested by a user who is viewing published copies of the transferred copies via the server 40.

FIG. 3 shows an exemplary diagram of a plurality of small size objects, $11^S$ to $130^S$, that were transferred and published. An average online photo album contains more images, fifty, with each original sized image potentially originating from an 8 megapixel camera. A drawback of the convention method illustrated in FIG. 1 is that the delay from the moment the user requests an upload of the 50 images from the local client device 20 to the time all sizes are transferred in order, following the order shown at 50, published for display, and available for selection is usually more than fifteen minutes. The known method of FIG. 1 also only enable the user to select a transferred object and requests editing or some other action for the selected object after all the smallest size and other size copies are transferred in order from small to large size as shown at 50. Consequently, a user starts the upload using the conventional method of FIG. 1 and then must wait several minutes before being able to view all thumbnail copies of the image. Moreover, according to some known methods, only after all images are transferred, i.e., after the last thumbnail is viewable and its corresponding copies have been transferred, is the user enabled to selectively request action for any of the transferred objects.

One known method described in U.S. Published Application No. 2002/0135794 transfers lower-resolution copies of digital images to a central server using relatively low-bandwidth communication and subsequently transfer higher-resolution copies of the digital images to the central server using relatively high-bandwidth communication. This known method is sensitive to bandwidth and has the drawback of not being adaptable. That is, the method of U.S. Published Application No. 2002/0135794 determines the transfer sequence based on resolution and bandwidth, and does not provide adaptability for controlling the transfer sequence as a function of actions requested by a user who is accessing transferred digital images. For example, if the user views one or more of the transferred lower-resolution copies and decides that he/she wants to delete or otherwise modify one or more of the images for some reason, and the corresponding higher-resolution copies has not yet been transferred, the method of U.S. Published Application No. 2002/0135794 does not provide a method to determine whether to reprioritize the transfer of the untransferred higher-resolution copies of the corresponding digital images as a function of the requested modification. Thus, the method of U.S. Published Application No. 2002/0135794 has a drawback of having no feedback of the users request for deletion, for example, in order to halt the transfer of unneeded larger high-resolution copies, so time is wasted transferring the corresponding higher-resolution copies of images even though the user has already indicated he/she wants those images deleted, in this example. Thus, the method of U.S. Published Application No. 2002/0135794 has a drawback of not being adaptable to user demands and thereby lessening the user experience by wasting valuable transfer time transferring large higher-resolution copies that are not needed. As a result of the wasted time in this example, the method of U.S. Published Application No. 2002/0135794 takes more time than necessary to transfer needed images, causing the user to experience needless delays in viewing the images.

For another example, if the user views one or more of the transferred lower-resolution copies and decides that he/she wants to view a corresponding higher-resolution copy and the corresponding higher-resolution copies has not yet been transferred, the method of U.S. Published Application No. 2002/0135794 does not provide a method to reprioritize the transfer of the desired untransferred higher-resolution copy as a function of the user interaction with the lower-resolution copy. That is, for the known methods, the requested higher-resolution copy is not sent earlier based on the user request. Consequently, for the known methods there are unnecessary delays before the user can view the requested larger image and thus, the user experience is diminished.

What is needed therefore is an adaptable method that can reprioritize transfer of an untransferred copy of a digital media object as a function of user requests for action regarding an already transferred smaller size representations of the same digital media object.

The following scenario further illustrates a drawback of the known methods. During the uploading of a 50 image photo album, for example, the user at the webpage viewing the thumbnail images that have been transferred and published for display might realize upon viewing a particular thumbnail image that she wishes to delete an image that is cutoff, poorly lit, or otherwise undesirable. According to a known method, the user must wait for all the images in all sizes to be transferred and published before being allowed to request deletion of the undesirable image. That is, the user viewing the published undesirable thumbnail image is unable to halt the transfer of other sizes of the undesirable image even though he/she wishes to delete all copies in all sizes of the image. As a result, the user's experience is diminished due to the delays and time is wasted transferring large sized copies corresponding to the poor quality thumbnail image that the user wishes to delete.

The drawback of known methods is further compounded when there is a slower connection from device 20, e.g., a dial-up connection, slow wireless connection. Use of those slower connections can cause a delay of a half hour to an hour or more before all photos, in the example above, are transferred. There is therefore a need for a method that adapts to user interaction with a published representation of a digital media object so as to enable more rapid access by a user to the published object and more efficiently transfers multiple sizes of a digital media object.

It should be appreciated that there are drawbacks described above apply similarly to audio, video, and image and other digital media objects. It is desirable to transfer smaller file size copies of an audio file or a video file, for example, to provide a preview to a user along with the full original sized object. Moreover, the drawback of known methods is compounded for video files which are much larger on average than the average image or audio file.

There is also thus also a need for an adaptable method that enables more efficient transfer and publication based on user interaction with published transferred representations of digital media objects so as to avoid wasting time transferring objects when the user may have already decided to delete or otherwise alter the object based on a published smaller version of the objects. Known systems allow a user to request that other modifications be performed on a published digital media object. For example, a user typically can request rotation of a selected image or video object, adding a caption to a selected image or video object, or placing a copy of the digital media object, i.e., image, audio, or video objects, into a collection. Typically, collections such as collections 1 and 2, identified as 42 and 44 respectively in FIG. 1 are created and made selectively shareable with other users having access to the server 40. Known sharing websites also allow a user to selectively authorize another user to access and cause an action to be taken on shared digital media objects. For example, the authorization might restrict another user to viewing the image or video object or listening to the audio object. Alternatively, the user may select to authorize another user to alter shared objects. The user experience is lessened if needless delays occur in known systems by not reprioritizing transfer based on user actions, for example, if the user views a transferred and published thumbnail image object and requested deletion of the object such that transfer of other untransferred copies of the corresponding digital media object are not needed. What is needed therefore is a method that, in response to the action requested by the user, determines as a function of the requested action whether to reprioritize transfer of any and all untransferred copies of the corresponding digital media objects.

SUMMARY OF THE INVENTION

The present invention provides a method for facilitating user interaction with a plurality of digital media objects in a more efficient way so as to enhancing the overall user experience with published digital media objects. The method provides feedback of the user interaction and any requested action therefrom for substantially-reduced data size representations and in response thereto, determining as a function of the requested action whether to reprioritize transfer of untransferred original data size copies and any other untransferred representations of the corresponding digital media object.

Broadly stated, the present invention provides a method for facilitating user interaction with a plurality of digital media objects, comprising the steps of receiving a request to transfer the digital media objects to a second computing device from a first computing device; transferring representations of substantially-reduced data size of each of the digital media objects to the second computing device; subsequently transferring copies of original data size of each of the digital media objects to the second computing device; wherein each of the substantially-reduced data size representations and copies of original data size have a transfer priority, wherein the transfer priority of each of the substantially-reduced data size representations is higher than the corresponding transfer priority for each of the corresponding original data size copies; publishing the transferred substantially-reduced data size representations so as to enable interaction therewith by a user through a user interface and so as to enable the user to selectively request that an action be performed on one of the digital media objects by requesting that the action be performed on the corresponding published substantially-reduced data size representation; in response to the action requested by the user, determining as a function of the requested action whether to reprioritize transfer of any and all untransferred copies of the corresponding digital media objects; and wherein a unique identifier is associated with each digital media object and the corresponding substantially-reduced data size representation and original data size copy.

Broadly stated, the present invention also provides a method for facilitating user interaction with a plurality of digital media objects, comprising the steps of receiving a request to transfer the digital media objects to a second computing device from a first computing device; storing representations of substantially-reduced data size of each of the digital media objects in a first queue; subsequently transferring representations from the first queue to a second computing device; storing copies of original data size of each of the digital media objects in a second queue; subsequently transferring copies from the second queue to the second computing device; publishing the transferred substantially-reduced data size representations so as to enable interaction therewith by a user through a user interface and so as to enable the user to selectively request that an action be performed on one of the digital media objects by requesting that the action be performed on the corresponding published substantially-reduced data size representation; wherein the first queue and second queue enable reordering priority of transfer from the first and second queues such that the priority of any representations and copies stored therein can be changed, and wherein the first queue and second queue enable removal of representations and copies stored therein; in response to the action requested by the user, determining as a function of the requested action whether to reprioritize transfer of any and all untransferred copies of the corresponding digital media objects from the corresponding queue; and wherein a unique identifier is associated with each digital media object and the corresponding substantially-reduced data size representation and original data size copy.

An advantage of the present invention is that it is adaptable based on user interaction with published representations of digital media objects. Another advantage according to an embodiment of the method present invention is that the adaptability of the present invention improves the user experience is that it reduces delay, including the delay before a representation of a digital media object is available on which the user can take action.

Another advantage of the present invention is that it is enables feedback of user interaction and any requested action therefrom for a published substantially-reduced data size representations of a digital media object and determines as a function of the requested action whether to reprioritize transfer of untransferred original data size copies of the corresponding digital media object such that delays are reduced.

Another advantage of the present invention is that it provide for modification of copies that are to be transferred according to modifications requested by the user with respect to the transferred substantially-reduced data size representations.

These and other embodiments, features, aspects, and advantages of the invention will become better understood with reference to the following description, appended claims and accompanying drawings.

BRIEF DESCRIPTION OF THE DRAWINGS

FIG. 4 shows a block diagram illustrating a system for illustrating aspects of the method according to an embodiment of the present invention;

FIG. 5 shows exemplary representations and an original data size copy of each digital media object according to the method of the present invention;

Figure 1:
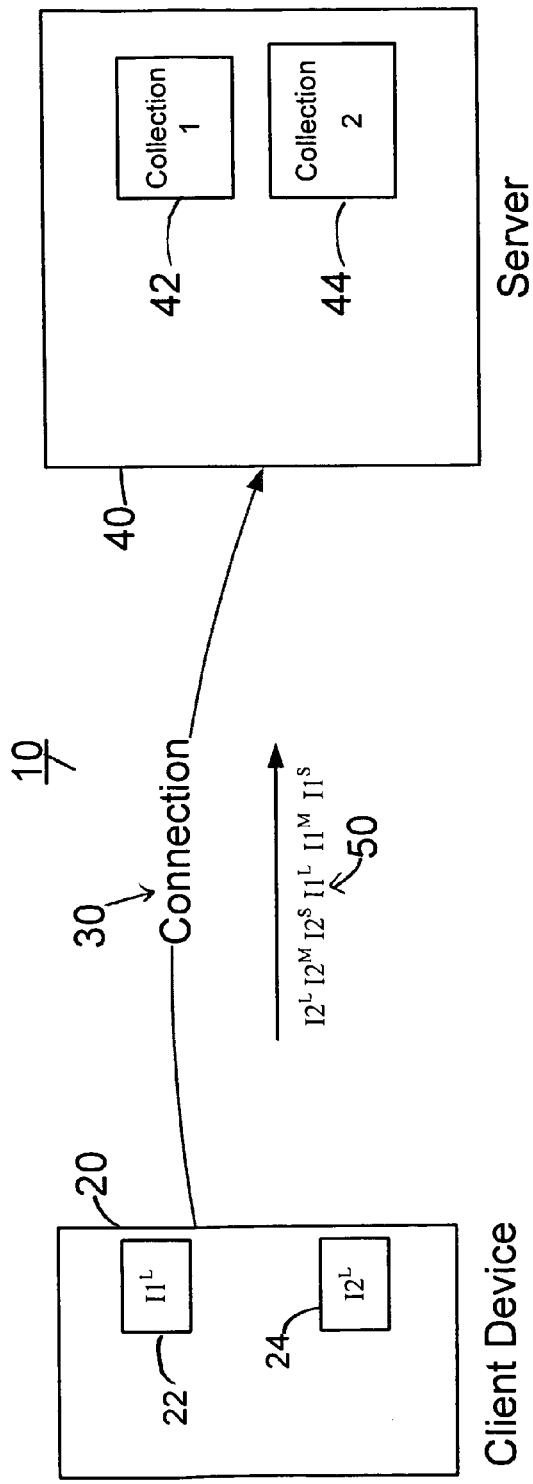
FIG. 1 shows an exemplary block diagram illustrating digital object transfer and publishing aspects according to a prior art method.
Figure 2:
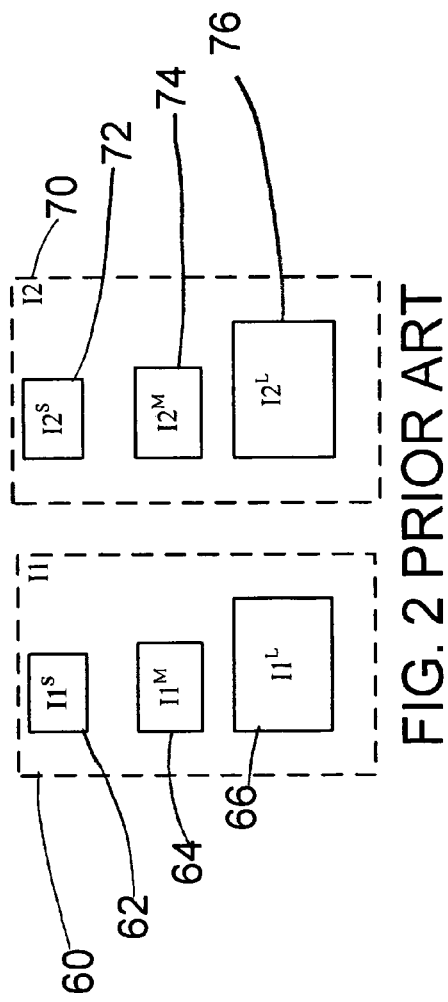
FIG. 2 illustrates exemplary reduced file sized copies and the original file size copies of two digital media objects.
Figure 3:
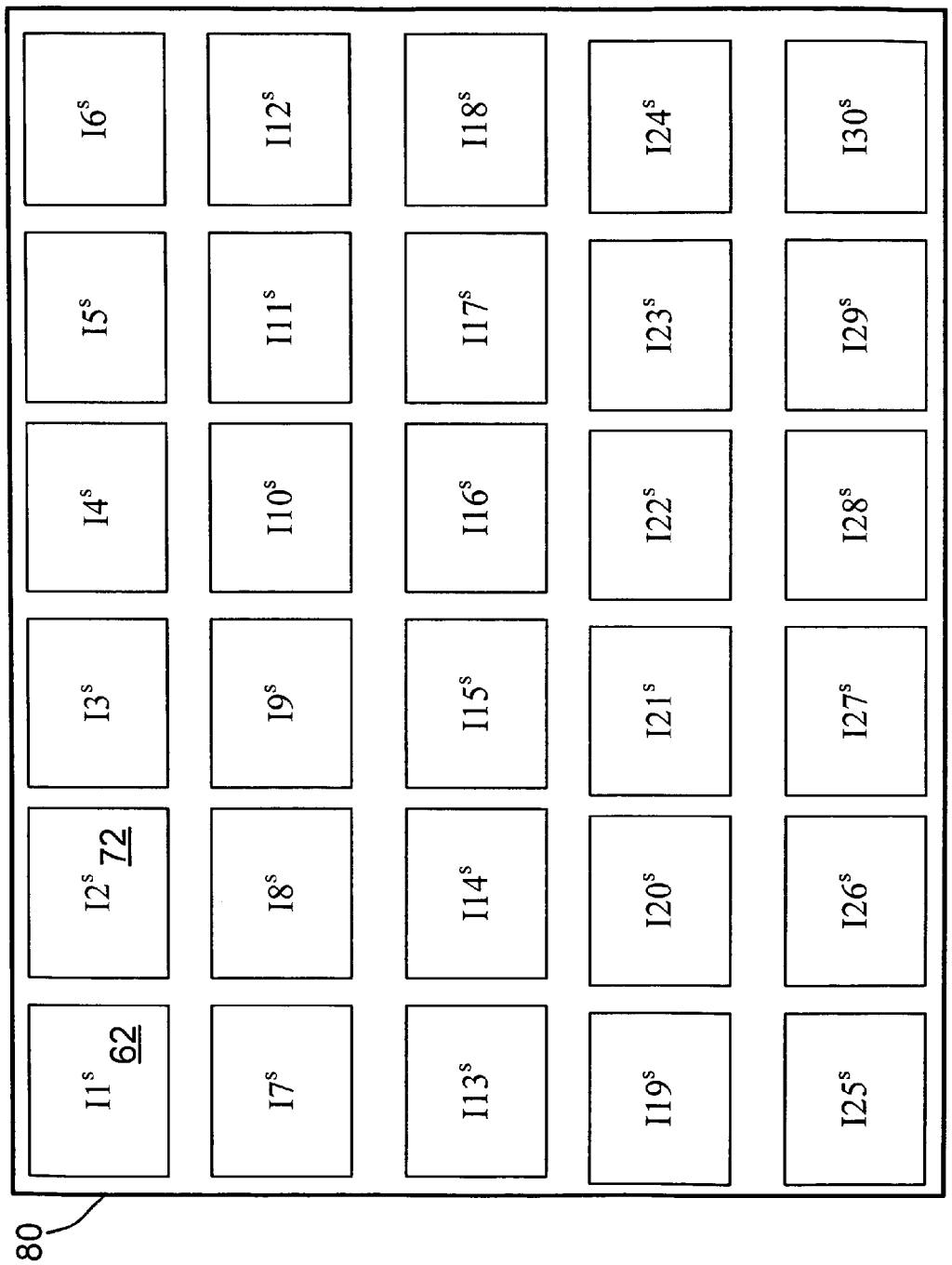
FIG. 3 shows an exemplary diagram of blocks representing a plurality of substantially-reduced objects that have been transferred and published.

Reference symbols or names are used in the Figures to indicate certain components, aspects or features shown therein, with reference symbols common to more than one Figure indicating like components, aspects or features shown therein.

DETAILED DESCRIPTION OF THE INVENTION

FIG. 4 shows a block diagram illustrating a system 100 illustrating aspects of the method according to an embodiment of the present invention. Although examples relating to photo and digital image objects are described herein, the method of the present invention is usable for transferring objects in other digital media including audio and video.

The system 100 includes a client device 120 connecting via a connection 130 to a computing device 140. The client device 120 is a computing device, e.g., a personal computer, wireless handheld device, or the like. The computing device 140 is a device capable of receiving content from device 120 and publishing that content for distribution via wired or wireless means. The computing device 140 is preferably a server. The connection 130 is via any suitable connection protocol, wired or wireless for connecting two devices, e.g., BLUETOOTH, cellular. The connection 130 is preferably an Internet network connection. The content may be placed in a collection, e.g., collection A, identified as 142, and collection B, identified as 144.

According to the method of the present invention, the computing device 140 both receives copies via the connection 130, receipt indicated by the arrow 170, and feeds back information to the client device 120 via the connection 130, receipt at the client device 120 indicated by the arrow 160. This feedback from computing device 140 according to an aspect of the method of the present invention enables adaptability in the use of the information fed back to the local client application, e.g., for reprioritizing, i.e., reprioritization of the transfer sequence from client device 120 to computing device 140.

Figure 6:
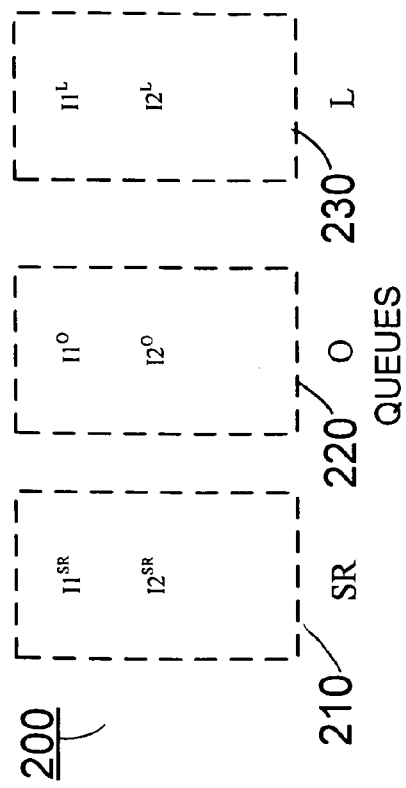
FIG. 6 shows an exemplary queue aspect according to a preferred embodiment of the method of the present invention.

According to an embodiment of the method of the present invention, a request is received to transfer one or more digital media objects from the client device 120 to the computing device 140 for publishing thereon such that a user can access the published objects via the connection 130 from the client device 120 or via another wired or wireless connection to a third computing device, e.g., device 300 in FIG. 6. The request is preferably received via a user interface of a local application installed on the device 120.

In the exemplary system diagram in FIG. 4, a request is made to transfer, i.e., upload, two digital media objects $I1^L$, identified as 22, and $I2^L$, identified as 24, from the client device 120 to the computing device 140. The objects 22 and 24 have an original data size also referred to as the large size noted by the superscript "L". In the example in FIG. 4, the objects are stored in memory in client device 120, take up an original data size for storage and may be in a database, a file, or the like. The digital media objects may be images, video, or audio objects. The objects 22 and 24 are preferably stored in client device 120 and accessible by the local client application therefrom. Alternatively the objects 22 and 24 are not stored on device 120, but are accessible by the local client application installed on client device 120, e.g., objects stored on an audio device, digital video camcorder, or digital image camera, cell phone, or the like that is connected wirelessly or otherwise to client device 120.

FIG. 5 shows two sets 180, 190 of three representations of a digital media object I1, I2 including a substantially-reduced representation, identified by "SR", ($I1^{SR}$, 182 and $I2^{SR}$, 192), "other" representation, identified by "O", ($I1^O$, 184 and $I2^O$, 194) and a copy of the original data size of the digital media object, identified by "L" ($I1^L$, 186 and $I2^L$, 196) After receipt of the request to transfer, the method includes transferring substantially-reduced data size representations of each of the digital media objects to the computing device 140. Referring to the exemplary system diagram in FIG. 4, the substantially-reduced file size copy $I1^{SR}$ is transferred first, followed by substantially-reduced file size copy $I2^{SR}$ of digital media object I2, as shown at 150.

According to the method of the present invention, each of the substantially-reduced data size representations, e.g., $I1^{SR}$, and copies of original data size, e.g. $I1^L$, have a transfer priority, wherein the transfer priority of each of the substantially-reduced data size representations e.g., $I1^{SR}$, is higher than the corresponding transfer priority for each of the corresponding original data size copies e.g. $I1^L$. According to an alternative embodiment of the method, there are no other representations, such as $I1^O$ Preferably, there are one or more other representations, such as $I1^O$ and $I2^O$ and these other representations have a transfer priority lower than for the corresponding substantially-reduced data size representations, and higher than for the corresponding original data size copies.

The substantially-reduced data size representation is of substantially-reduced data size relative to the corresponding digital media object and preferably is the smallest size representation of the corresponding digital media object transferred to device 140. Preferably, the substantially-reduced data size representation comprises identifying information, e.g., data about the data, provided by the requester of the transfer. For example, the method prompts the user to provide information such as the subject, title, category, and other information, also referred to as metadata, about the digital media object before transfer. The method of the present invention generates a substantially-reduced data size representation that comprises identifying information that preferably is text information that is a subset of the input metadata. Alternatively, the identifying information is automatically generated without input from the requester, e.g., based on other information associated with the digital media object on the first computing device 120.

The substantially-reduced data size representation comprises identifying information such that, once transferred to device 140 and published, enables a user to request action on the digital media object based only on the identifying information in the substantially-reduced data size representation. The substantially-reduced data size representation preferably includes the identifying information without data of the digital media object such that the substantially-reduced data size representation is much smaller and more rapidly transferred than the digital media object. In the case of images, for example, the data size of the identifying information is much smaller than even a reduced thumbnail representation of the image, that is, unless the digital media object is miniscule, in which case the thumbnail representation would be considered the substantially-reduced data size representation that is transferred first. Alternatively, the substantially-reduced data size representation is a substantially-reduced copy of the contents of the digital media object, e.g., a thumbnail image.

Alternatively, for a digital video object, the substantially-reduced data size representation comprises one or more still-frames of the corresponding digital media object.

The "other" representations shown in FIG. 5, $I1^O$, $I2^O$, are preferably of a data size between the substantially reduced representation and the original data size. For example, the other representation is a compressed version of the digital media object. Preferably, one of the other representations for image content is a thumbnail. In the case of a digital video object or audio digital object the other representations are preferably generated by different compression methods.

According to a preferred embodiment of the method, the local application on the client device 120 generates the substantially reduced data size, multiple other representations, and original data size copies of each digital media object. Alternatively, only a subset of the multiple generated representations are stored on client device 120 in order to reduce space requirements. Preferably, the substantially reduced data size representation and three other representations are generated in addition to the original data size copy of each of the digital media objects, but only the substantially reduced data size representation, one of the three other representations and the original digital media object are stored on the client device 120. According to an alternative embodiment, the other representations are accessible to the client application on device 120 for the method of the present invention, but are not generated by that client application.

The method includes publishing the transferred substantially-reduced data size representations so as to facilitate user interaction with those representations earlier, i.e., without the delay of known methods. As seen in the example in FIG. 7, transferred substantially-reduced data size representations, $I1^{SR}$ and $I2^{SR}$ are shown published and accessed via device 300. Preferably, the published substantially-reduced data size representations enable the user to view identifying information contained therein and take action based on that information, e.g., select a representation via a left mouse click and request an action such as deletion, rotation, request original data size copy or other representation via a right mouse click.

The method provides feedback shown at 160 of the requested user actions, e.g., from device 140 in FIG. 4 to client device 120 over the connection 130. This feedback provided by the method of the present invention enables adaptability in the use of the information fed back to the local client application for reprioritizing the transfer of untransferred representations and copies of digital media objects.

According to the method of the present invention, a unique identifier is associated with each digital media object and the corresponding substantially-reduced data size representation and original data size copy. The unique identifier is also associated with any other representations of the corresponding digital media objects.

Figures 8, 9:
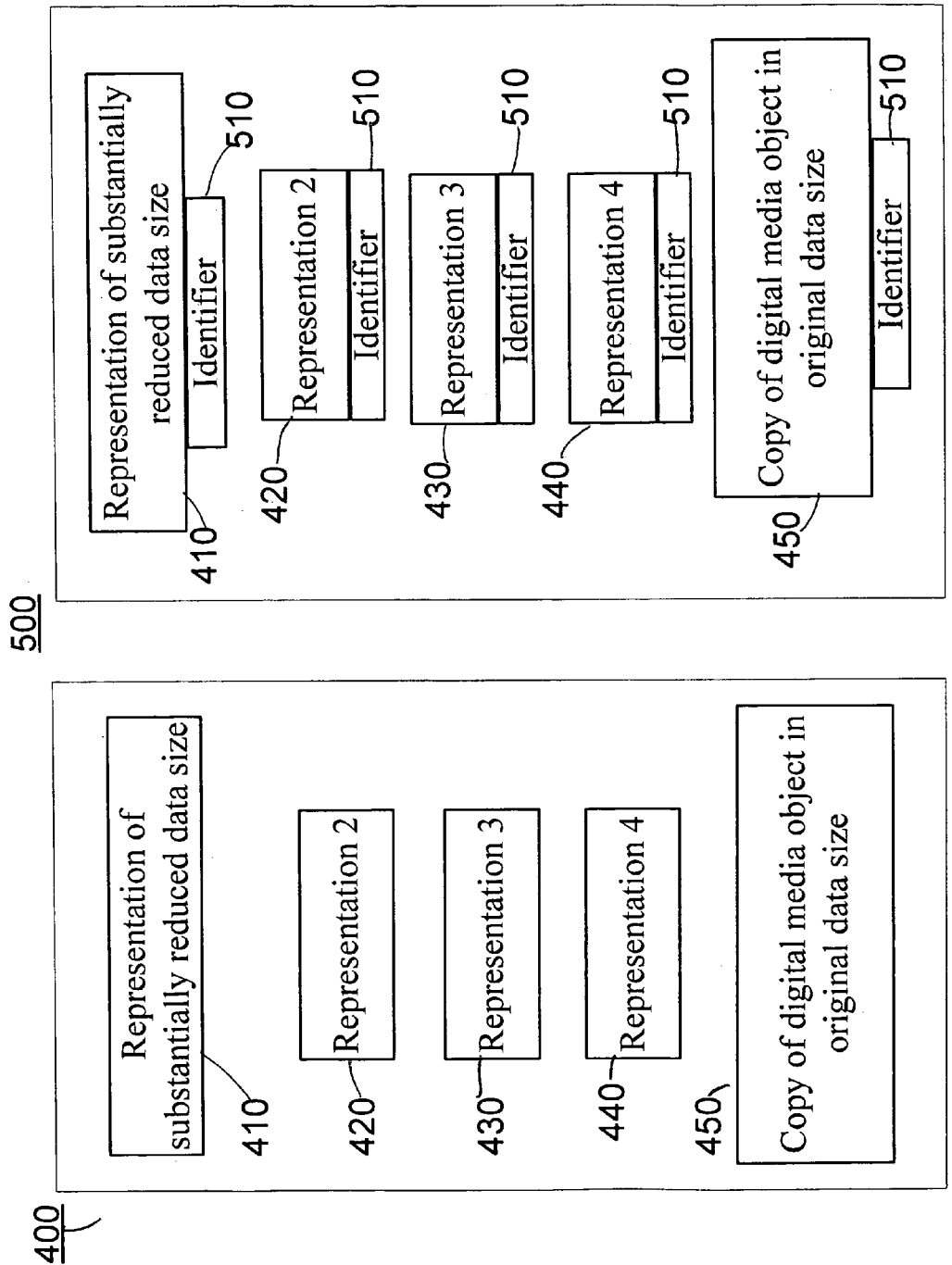
FIG. 8 shows an exemplary set of four representations and a copy of a digital media object for transfer according to an embodiment of the method of the present invention.
FIG. 9 shows the exemplary set wherein each representation and copy in FIG. 8 is transferred along with the unique identifier associated with the corresponding digital media object.

FIG. 8 shows an exemplary set 400 of four representations 410, 420, 430, 440 and a copy 450 of a digital media object for transfer according to an embodiment of the method of the present invention. FIG. 9 shows the exemplary set wherein each representation and copy in FIG. 8 is transferred along with the unique identifier 510 that is associated with the corresponding digital media object.

Referring also back to FIG. 4, the unique identifiers, such as 510, for the digital media objects are preferably generated at the first device 120 shown in FIG. 4 and transferred along with the corresponding substantially-reduced data size representation, original data size copy, and, other representations, if any. Alternatively, after transfer of the corresponding substantially-reduced data size representation, original data size copy, and, other representations, if any, a unique identifier 510 for each digital media object is generated at the second computing device 140 and subsequently sent to the first computing device 120 from the second computing device 140.

The method includes publishing the transferred substantially-reduced data size representations so as to enable interaction therewith by a user through a user interface and so as to enable the user to selectively request that an action be performed on one or more of the corresponding published substantially-reduced data size representations. The actions include, for example, editing actions such as deletion, rotation, placement into a collection, copying, etc. as would be known to one of ordinary skill in the art.

A substantially-reduced data size representation preferably comprises identifying information, without data of the digital media object, such that the substantially-reduced data size representation is much smaller and more rapidly transferred than the digital media object or other representations. It should therefore be appreciated that the rapid transfer of such small representations enables a user to request an action for a published substantially-reduced data size representation before the transfer of any or all other representations and copies of all the digital media object has completed.

In response to the action requested by the user, the method determines as a function of the requested action whether to reprioritize transfer of any and all untransferred copies of the corresponding digital media objects. The unique identifier is for providing linkage between the digital media object, and its representations and copies. Thus, the unique identifier provides a linkage between the published substantially-reduced data size representations and any untransferred representations and original data size copy of the corresponding digital media object. According to an embodiment of the method of the present invention, the untransferred copies are not transferred if the requested action modifies the corresponding substantially-reduced data size representation so as to indicate that transfer of the untransferred copies of the corresponding digital media objects is not required. For example, if the requested modification is deletion, the untransferred representations and untransferred original data size copy are not transferred.

The method also provides adaptability to reduce delays in satisfying user requests that require other untransferred representations or the original data size copy itself. That is, if executing the requested action by the user regarding a published substantially-reduced data size representation requires publishing an untransferred representation or copy of the corresponding digital media object, the method prioritizes transfer of the untransferred copy such that the untransferred copy is transferred before other untransferred representations and copies.

If it is determined that there is no requested action fed back or no action is fed back that should affect the transfer sequence, e.g., a request to delete a copy, the transferring continues in the order as follows: after transfer of the substantially-reduced data size representations, the other representations, if any, are transferred in turn to the computing device, and after transfer of the other representations, if any, the copies of the original data size copies of the digital file objects are transferred to the device 140. Alternatively, the original file size digital media objects may be transferred without generation of another original file size copy. Thus, the transfer sequence, absent any feedback from device 140 regarding requested action that causes reprioritizing of the transfer, would be as shown at 150: $I1^{SR}$, followed by $I2^{SR}$, followed by $I1^O$, followed by $I2^O$, followed by $I1^L$, followed by $I2^L$.

According to a preferred embodiment of the method of the present invention, if the requested action that is fed back calls for deletion of the selected substantially-reduced file size copy, all untransferred corresponding other reduced copies and original file size copies of the corresponding digital media object are not transferred. For example, suppose the user requests upload of 50 images for publishing. After the first two substantially-reduced data size representations are transferred and published, the user viewing the published webpage, for example, sees only substantially-reduced data size copies, "$I1^{SR}$" and "$I2^{SR}$" and not the rest since they have not yet completed the transferring and publishing process, see e.g., FIG. 7. Suppose the user decides that he/she finds copy $I2^{SR}$ undesirable based on the identifying information of the substantially-reduced data size representation. For example, e.g., the subject in the identifying information for the preferred substantially-reduced data size representation indicates to the user that it is not a desired digital media object that the user wants published. Alternatively, the substantially-reduced representation is a substantially-reduced copy of the digital media object, and the user can request action based on interacting with that copy. According to known methods, the user would have to wait for all the digital media objects to be transferred before he/she was allowed to delete the item, or the user might be allowed to select a thumbnail, for example, and request deletion, but the action would not be fed back to the device 120 so as to enable halting of unneeded transfers. That is, the known methods are not-adaptable. The method of the present invention is adaptable in that it enables reprioritizing of the transfer sequence in response to user actions.

For another example, if the requested action is rotation of the image content of a corresponding digital media object by a selected amount, untransferred representations and the original data size copy of the corresponding digital media object are not transferred, representations and the original data size copy of the corresponding digital media object rotated by the corresponding selected amount are generated and subsequently transferred to the second computing device 140 shown in the example in FIG. 4.

The method of the present invention preferably enables reprioritizing of the transfer of untransferred representations and copies of a digital media object in response to predetermined modifications of the digital media object on the first computing device 120. For example, if a digital media object is deleted on the first computing device before the transfer of the corresponding representations and copies of a digital media object, the method preferably reprioritized transfer so as to remove the untransferred representations and copies from the transfer sequence.

It would be advantageous to more rapidly transfer objects and other representations based on the demand expressed for the published substantially-reduced representation. The method of the present invention preferably enables reprioritizing of the transfer of untransferred representations and copies of a particular digital media object as a function of demands for the particular published digital media object received at the second computing device 140.

The method according to a preferred embodiment includes queues for prioritizing transfer. FIG. 6 shows an exemplary queue arrangement 200 having three separate queues, 210, 220, 230, wherein three separate data sizes ("SR", substantially reduced, "O" other data size representation, and "L", large data size) are to be transferred to the computing device 140. The queues are structured such that items in the queue can be removed and the items can be reordered. For example, removal occurs for untransferred other representations or copies in the queue if the user interacts with the substantially-reduced data size representation so as to modify that representation in a way that indicates that the transferring of the untransferred other representations or copies is unnecessary, e.g., deletion. Preferably, there are five separate data sizes, including the substantially-reduced data size representation, three other representations in three distinct categories, e.g., three distinct compression types, and the original data size, and three queues such that all of the "other" representations are stored in one queue, the substantially-reduced data size representation is stored in a first queue, and copies of the original data size are stored in a second queue, and all of the "other" representations are stored in a third queue. Preferably, the other representations are each associated with the different category, e.g., different compression method. Alternatively, the other representations are stored in more than one queue, such as in a separate queue for each category. According to a preferred embodiment, the method orders the sequence for the transfer of the queued copies to the computing device 140.

Alternatively, the method includes generating representations of substantially-reduced data size of each of the digital media objects; storing the substantially-reduced data size representations in a first queue; generating copies of original data size of each of the digital media objects, storing the original data size copies in a second queue; generating the other representations of each of the digital media objects in a plurality of publication categories, storing the other representations in one or more additional queues; and transferring the other representations in the one or more additional queues to the second computing device after transfer of the substantially reduced data size representations in the first queue and before the transfer of the original data size copies in the second queue.

Figure 7:
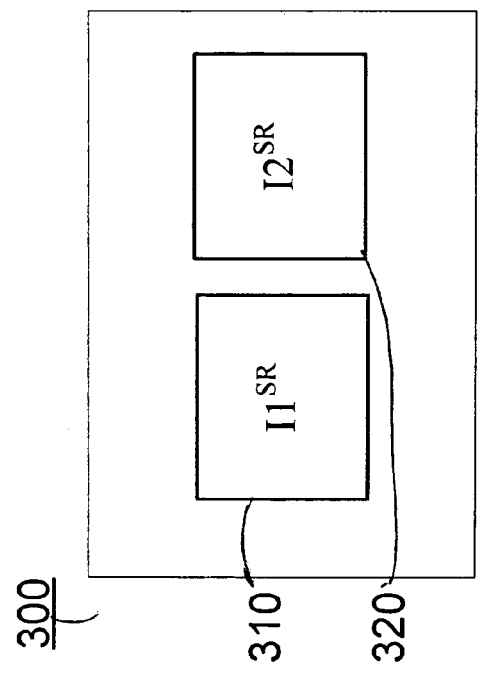
FIG. 7 illustrates a portion of an exemplary published webpage showing blocks representing two transferred substantially-reduced objects.

The method of the present invention enables the user who requested the transfer to have access to copies of published objects via the connection 130 from either the client device 120 or from another computing device, e.g., device 300 shown in a block diagram in FIG. 7. Preferably the access is via a published webpage accessible via a browser having a user interface. Alternatively, the method enables the user who requested the transfer at client device 120 to share the objects by making them public or authorizing particular users to have access to the published objects. The authorization may include allowing one or more other users to be able to selectively edit the published objects, including deletion, rotation, etc.

The requested action by the user for a selected substantially-reduced file size copy can include placement of a copy of the selected copy into one or more collections, e.g. 142, 144 in FIG. 4. In response to the requested placement action, the method associates copies of the selected copy and the corresponding other reduced and original file size copies with the selected one or more collections.

It should be appreciated that although some aspects of the present invention described herein are applicable to image and video objects, e.g., thumbnails, the method of the present invention is not limited to use for image and video objects but is also usable for digital audio objects and other digital media objects.

Having disclosed exemplary embodiments, modifications and variations may be made to the disclosed embodiments while remaining within the scope of the invention as described by the following claims.

What is claimed is:

1. A method for facilitating user interaction with a plurality of digital media objects, comprising the steps of:

receiving a request to transfer the digital media objects to a second computing device from a first computing device;

transferring representations of substantially-reduced data size of each of the digital media objects to the second computing device;

subsequently transferring copies of original data size of each of the digital media objects to the second computing device;

wherein each of the substantially-reduced data size representations and copies of original data size have a transfer priority, wherein the transfer priority of each of the substantially-reduced data size representations is higher than the corresponding transfer priority for each of the corresponding original data size copies;

publishing the transferred substantially-reduced data size representations so as to enable interaction therewith by a user through a user interface and so as to enable the user to selectively request that a modification be performed on one of the digital media objects by requesting that the modification be performed on the corresponding published substantially-reduced data size representation;

in response to the modification requested by the user, determining as a function of the requested modification whether to reprioritize transfer of any and all untransferred copies of the corresponding digital media objects;

wherein the untransferred copies are not transferred if the requested modification modifies the corresponding substantially-reduced data size representation so as to indicate that transfer of the untransferred copies of the corresponding digital media objects is not required;

wherein if the requested modification is rotation of the image content of a corresponding digital media object by a selected amount, untransferred representations and the original data size copy of the corresponding digital media object are not transferred, representations and the original data size copy of the corresponding digital media object rotated by the corresponding selected amount are generated and subsequently transferred to the second computing device; and wherein a unique identifier is associated with each digital media object and the corresponding substantially-reduced data size representation and original data size copy.

2. The method of claim 1, wherein transferring between the first computing device and the second computing device is via a wireless protocol.

3. The method of claim 1, wherein the unique identifiers are generated at the second computing device and sent to the first computing device from the second computing device.

4. The method of claim 1, wherein the unique identifiers for the digital media objects are generated at the first device and transferred along with the corresponding substantially-reduced data size representation and original data size copy.

5. The method of claim 1, further comprising after transferring representations of substantially-reduced data size of each of the digital media objects to a second computing device;

subsequently transferring other representations of each of the digital media objects to the second computing device, wherein the other representations have a data size between the substantially-reduced data size representation and the copies of original data size;

wherein the unique identifier for the corresponding digital media object is associated with each of the corresponding other representations.

6. The method of claim 5, wherein one of the other representations comprises identifying information for the digital media object.

7. The method of claim 6, wherein the digital media objects include image content and wherein the substantially-reduced data size representations are thumbnails.

8. The method of claim 5, wherein the number of other representations for each digital media object is three.

9. The method of claim 5, wherein only a predetermined number of the other representations are stored on the first computing device.

10. The method of claim 1, wherein each of the substantially-reduced data size representations comprises identifying information for the digital media object; wherein the identifying information enables the user to request the modification based only on the identifying information.

11. The method of claim 10, wherein the identifying information is text.

12. The method of claim 1, wherein the user interaction includes viewing the published digital media object.

13. The method of claim 1, wherein the requested modification is deletion.

14. The method of claim 1, wherein if executing the requested modification requires publishing an untransferred copy of the corresponding digital media object, prioritizing transfer of the untransferred copy such that the untransferred copy is transferred before other untransferred representations and copies.

15. The method of claim 1, wherein the digital media objects include image content.

16. The method of claim 1, wherein the digital media objects include video content.

17. The method of claim 16, wherein the substantially-reduced data size representation comprises one or more still-frames of the corresponding digital media object.

18. The method of claim 1, wherein the digital media objects include audio content.

19. The method of claim 1, wherein the user interface is on a third computing device.

20. The method of claim 1, wherein the user interface is provided on the first computing device.

21. The method of claim 1, wherein the user interface is provided on a webpage accessible via a browser.

22. The method of claim 1, wherein the request to transfer originates from another user at the first computing device and wherein the user is authorized by the another user so as to enable the user to cause actions to be taken on the published representations and copies of original data size of the corresponding digital media objects.

23. The method of claim 1, wherein the method enables reprioritization of the transfer of untransferred representations and copies of a digital media object in response to a predetermined modification of the digital media object on the first computing device.

24. The method of claim 1, wherein the method enables reprioritizing of the transfer of untransferred representations and copies of a particular digital media object as a function of demands for the particular published digital media object received at the second computing device.

25. The method of claim 1, wherein the modification is at least one from the group consisting of deletion, rotation, placement into a collection, and copying.

26. A method for facilitating user interaction with a plurality of digital media objects, comprising the steps of:

receiving a request to transfer the digital media objects to a second computing device from a first computing device;

storing representations of substantially-reduced data size of each of the digital media objects in a first queue;

subsequently transferring representations from the first queue to a second computing device;

storing copies of original data size of each of the digital media objects in a second queue;

subsequently transferring copies from the second queue to the second computing device;

publishing the transferred substantially-reduced data size representations so as to enable interaction therewith by a user through a user interface and so as to enable the user to selectively request that a modification be performed on one of the digital media objects by requesting that the modification be performed on the corresponding published substantially-reduced data size representation;

wherein the first queue and second queue enable reordering priority of transfer from the first and second queues such that the priority of any representations and copies stored therein can be changed, and wherein the first queue and second queue enable removal of representations and copies stored therein;

in response to the modification requested by the user, determining as a function of the requested modification whether to reprioritize transfer of any and all untransferred copies of the corresponding digital media objects from the corresponding queue;

generating other representations of each of the digital media objects in a plurality of publication categories, storing the other representations in the one or more additional queues;

transferring the other representations in the one or more additional queues to the second computing device after transfer of the substantially reduced data size representations in the first queue; and wherein a unique identifier is associated with each digital media object and the corresponding substantially-reduced data size representation and original data size copy.

27. The method of claim 26, further comprising the steps of: generating representations of substantially-reduced data size of each of the digital media objects; and generating copies of original data size of each of the digital media objects.

28. The method of claim 26, wherein separate queues are associated with each category and wherein the other representations are stored in the corresponding separate queue.

\* \* \* \* \*